US010296515B2

(12) United States Patent
Nikhra et al.

(10) Patent No.: US 10,296,515 B2
(45) Date of Patent: May 21, 2019

(54) ENGINEERING DATA COLLECTION FROM CONTROL AND INSTRUMENTATION SYSTEMS

(71) Applicant: Honeywell International Inc., Morris Plains, NJ (US)

(72) Inventors: Abhishek Nikhra, Karnataka (IN); Ramakrishnan Ganapathi, Karnataka (IN); Manas Dutta, Karnataka (IN); Kiran N, Karnataka (IN); Ravi Kumar R, Karnataka (IN); Avinash Rajan, Karnataka (JP)

(73) Assignee: Honeywell International Inc., Morris Plains, NJ (US)

( * ) Notice: Subject to any disclaimer, the term of this patent is extended or adjusted under 35 U.S.C. 154(b) by 280 days.

(21) Appl. No.: 15/177,792

(22) Filed: Jun. 9, 2016

(65) Prior Publication Data
US 2017/0357702 A1 Dec. 14, 2017

(51) Int. Cl.
G06F 17/30 (2006.01)
G06F 16/25 (2019.01)
G06F 16/2458 (2019.01)
H04L 29/06 (2006.01)
G05B 19/00 (2006.01)

(52) U.S. Cl.
CPC .......... G06F 16/258 (2019.01); G05B 19/00 (2013.01); G06F 16/2477 (2019.01); H04L 63/08 (2013.01)

(58) Field of Classification Search
CPC ......... G06F 17/30569; G06F 17/30551; G06F 16/258; G06F 16/2477; G05B 19/00; H04L 63/08
See application file for complete search history.

(56) References Cited

U.S. PATENT DOCUMENTS

| 6,718,336 | B1 | 4/2004 | Saffer et al. |
| 9,521,055 | B2 * | 12/2016 | Turlington .......... H04L 12/4633 |
| 2002/0128731 | A1 * | 9/2002 | Wegerich ............... G05B 17/02 700/31 |
| 2007/0233728 | A1 * | 10/2007 | Puteick .................. G06Q 10/06 |
| 2013/0117334 | A1 | 5/2013 | Nordh et al. |
| 2014/0040182 | A1 * | 2/2014 | Gilder ................. G06F 17/2264 707/602 |
| 2015/0156072 | A1 | 6/2015 | Kirrmann |
| 2015/0236981 | A1 | 8/2015 | Rooyakkers et al. |
| 2016/0043866 | A1 | 2/2016 | Nixon et al. |
| 2016/0099863 | A1 | 4/2016 | Messinger et al. |
| 2016/0357176 | A1 * | 12/2016 | Chand ................ G05B 19/4185 |
| 2017/0109421 | A1 * | 4/2017 | Stearn ............... G06F 17/30569 |

FOREIGN PATENT DOCUMENTS

JP 2005317002 11/2005

\* cited by examiner

Primary Examiner — Huawen A Peng

(57) ABSTRACT

A system and method of engineering configuration data (ECD) collection for an industrial facility having a first control and instrumentation (C&I) system with first ECD using a first file format and a second C&I system with second ECD data using a second file format, and a data collection server. A first data agent has collection information regarding the first C&I system and a second data agent has collection information regarding the second C&I system. The first data agent collects the first ECD and the second data agent collects the second ECD. The first ECD and the second ECD are translated into one common generic data format. The first ECD and the second ECD are stored after being translated.

13 Claims, 6 Drawing Sheets

ENGINEERING DATA COLLECTION FROM CONTROL AND INSTRUMENTATION SYSTEMS

FIELD

Disclosed embodiments relate to computers used with processing facilities and more specifically relate to engineering data collection from control and instrumentation systems.

BACKGROUND

Processing facilities are often managed using process control systems also known as control and instrumentation (C&I) systems. Processing facilities can include manufacturing plants, chemical plants, crude oil refineries, ore processing plants, and paper or pulp manufacturing plants. These industries typically use continuous processes and fluid processing. C&I systems typically manage the use of motors, valves, sensors, gauges and other industrial equipment in the processing facilities. A manufacturing plant or refinery may have several industrial C&I systems such as one or more distributed control systems (DCS), programmable logic controls (PLC), safety system and applications for controlling different processes.

In modern plant engineering, there are C&I systems which include C&I devices that link all plant components (processing units to their respective C&I and between respective C&I systems). The C&I devices include input/output (I/O) modules that generally receive physical parametric (e.g., pressure, temperature) representations from sensors as standard current signals (4 to 20 mA). These signals are utilized by other various C&I devices including for regulating, safety, data acquisition and comparator systems for control, safety and instrumentation purposes. Specifically, conventionally various comparators compare the incoming 4-20 mA signals received from sensors against stored/set "set points" and create outputs used for plant safety, regulation, interlock or/and operation.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize collecting engineering configuration data (ECD) from different control and instrumentation (C&I) systems (e.g., from different manufacturers) installed in an industrial facility (IF or a "plant") is a major problem because each C&I system may have differences including a different file format that is reflected in the ECD. As used herein a C&I system and a control system are synonymous. The file format for example can be binary, text or XML-based. If file is a relational database, then the information is stored in terms of records. Each C&I system can have different data storage mechanisms such as the relational databases SQL server or ORACLE, flat files, access databases or DBF files. Each C&I system can have different physical networks and/or a different communication protocol such as TCP/IP, controlNet, Ethernet/IP and foundation fieldbus. ECD as used herein is broad term that includes essentially all aspects of engineering performed in the C&I systems of an IF.

Disclosed embodiments solve this ECD collection problem by providing a data collection system framework that despite differences such in the data format and data storage mechanism utilized in the C&I systems collect ECD from the respective C&I systems and converts the ECD data received into a common generic format. Data agents are created for each C&I system that have C&I system dependent logic (configured for their particular data file format) to extract data. Since each C&I system can have its own method to format data and store data, it is recognized there cannot be a generic method that can be used for all C&I systems. Disclosed data agents and data parser pairs thus provide the capability to extract data from C&I systems which have different data file formats. The data agent is responsible for collecting ECD from its associated C&I system, whereas the data parser is responsible for interpreting the ECD received and converting it into common generic format. A data agent and parser pair is created for each supported C&I system. Once the data agent and parser pairs are generated, they are utilized in a disclosed ECD collection system.

Disclosed embodiments include a method of ECD collection for C&I systems in an IF. The IF includes a plurality of C&I systems including a first C&I system having first ECD using a first file format and a second C&I system having second ECD using a second (different) file format, and a data collection server. The method includes providing a first data agent having collection information regarding the first C&I system including a location (e.g. the node) that stores the first ECD and the first file format, and a second data agent having collection information regarding the second C&I system including a location that stores the second ECD and the second file format. Disclosed data parsers have the data format and syntax information used in their respective C&I system built or coded therein. This data format and syntax information can be gathered from highly skilled individuals that perform detailed analysis of the respective C&I system during development of each parser. The first data agent collects the first ECD and the second data agent collects the second ECD. The first and second ECD are translated into one common generic data format. The first and second ECD are stored after being translated by data collection block into the data server, generally being stored with timestamp.

Another disclosed embodiment comprises a system for collecting ECD for an IF. The system includes a data collection server that is communicatively coupled by a communication device to several C&I systems including a first C&I system having first ECD using a first file format and a second C&I system having second ECD using a second file format. The data collection server includes a first processor connected to a first storage device having a first non-transitory machine-readable storage medium storing a data collection and translation module. The data collection server is programmed to implement the data collection and translation module causing the data collection server to provide a first data agent having collection information regarding the first C&I system including a location of the first ECD and first file format, and a second data agent having collection information regarding the second C&I system including a location of the second ECD and the second file format. The first and second ECD is collected via the respective data agents. The first and second ECD are translated into one common generic data format. The first and second ECD are stored after being translated at the data collection server.

DETAILED DESCRIPTION

Figure 1A:
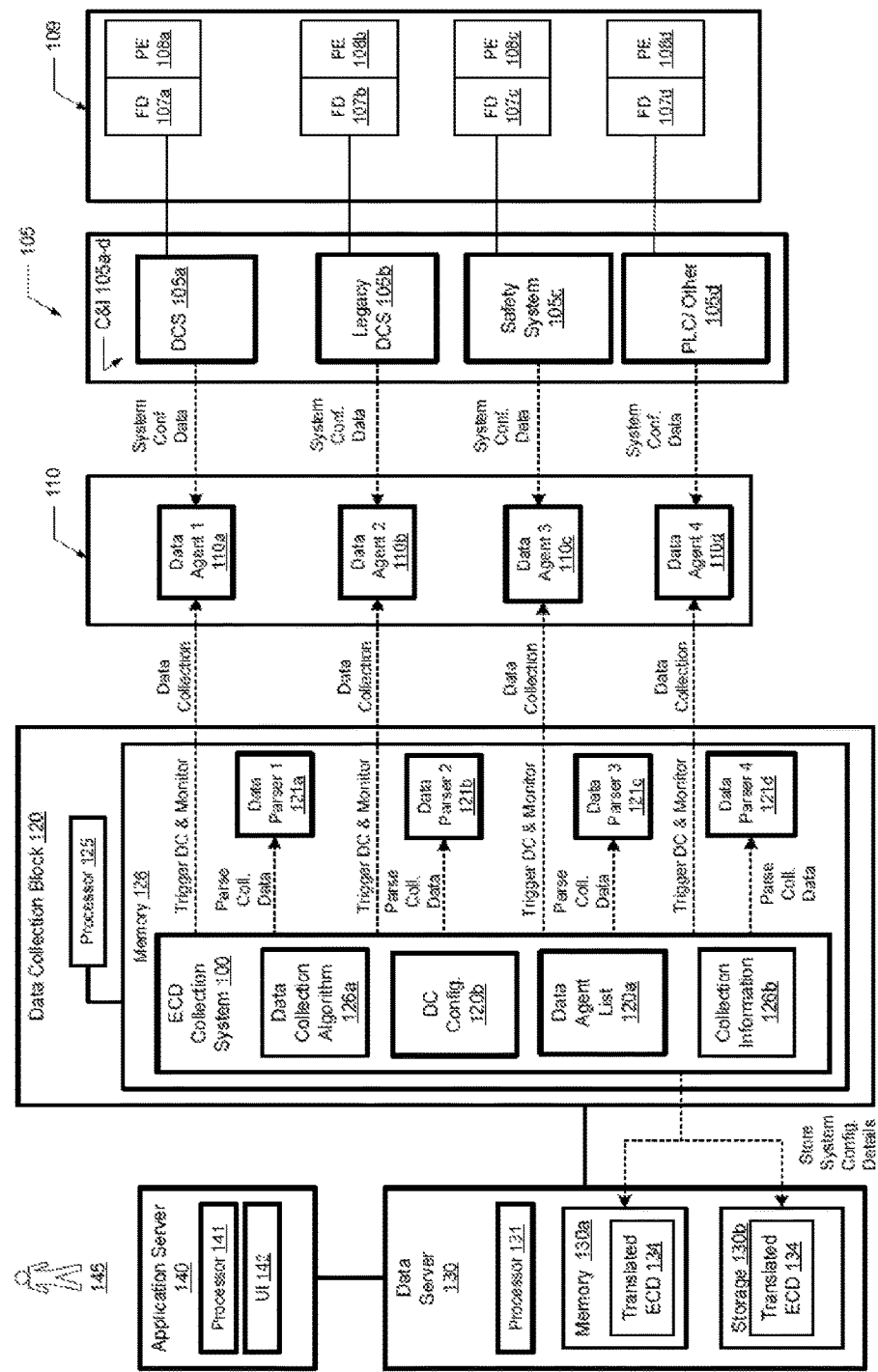
FIG. 1A is a diagrammatic view of a framework of hardware and software components including a system for collecting ECD from the respective C&I systems of an IF, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, system and computer program product for collecting ECD using disclosed data agents and data parser pairs. Disclosed data agents and data parser pairs are customized to provide the capability to extract data from a plurality of C&I systems which have different data or information sources for an IF having a plurality of C&I systems that collectively utilize at least different file formats. As described above, the C&I systems may also utilize different data storage mechanisms.

The C&I elements include computer nodes including servers, operator consoles and various networking devices switch, routers, firewalls. Regarding ECD, each of these C&I elements have properties that are configured to control their behavior. These elements along with their properties and their values are part of the ECD. An IF is divided into area, unit, and sub-units where each division is responsible for certain processing. Details about these divisions is part of the ECD details.

ECD details include a name or tag associated with different hardware and software elements in the IF for their identification. The hardware elements are physical connected to one or more communication networks. ECD includes information about how these elements are connected which is reflected in a network topology. ECD includes instrumentation details for example, field wirings from devices through junction box, marshalling cabinet to the process controller. Operator displays that are created in the system, include what graphical elements are used to create the displays, tags and values that are shown in the displays. ECD includes logic created in the C&I system or simulation system, and applications used to control the processing in the IF. ECD also includes details about the logic, type of the logic, control flow, graphical representation and connections, as well as the data flow between C&I systems, along with details of the physical medium and communication protocol.

FIGS. 1A and B show an example ECD collection system 100 that automatically collects ECD from the different C&I systems collectively having different data file formats in an IF 105. ECD collection system 100 is stored in memory 126 that is part of data collection block 120. IF 105 comprises the blocks shown in FIG. 1A including the application server 140, data server 130, C&I systems 105a-d, and the process unit block 109 controlled by the C&I systems 105a-d, as well as many other elements within the IF that are not shown. IF 105 is shown including a plurality of C&I systems 105a-d including a first DCS 105a, a legacy DCS 105b, a safety system 105c (including safety controllers, and network interface modules (NIMs)), and Programmable Logic Controller (PLC) or other controller 105d. As known in the art, the DCS 105b and PLC 105d each include at least one process controller, and at least one input/output (I/O). A PLC is generally used for control of small package processing equipment items such as compressors, and pumps. A PLC comprises a PLC controller along with related IO modules. The IF 105 includes at least one (and in some cases all) of first DCS 105a, legacy DCS 105b, safety system 105c, and PLC or other controller 105d. Each of the C&I systems 105a-d store ECD.

Figure 1B:
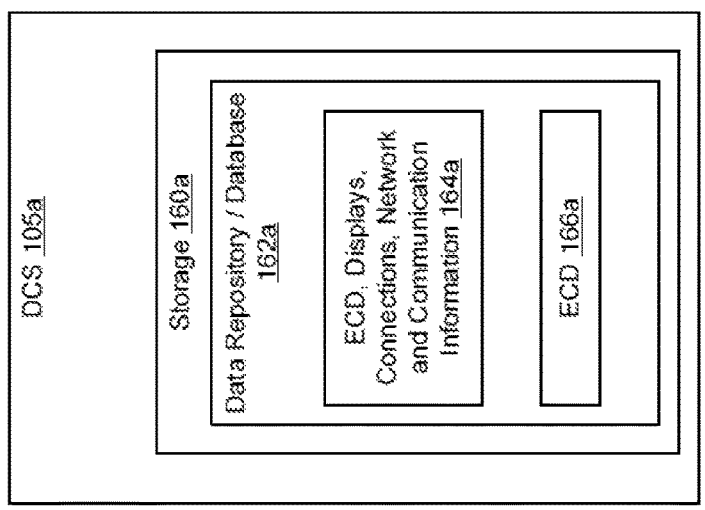
FIG. 1B is a block diagram of a storage portion of a C&I system shown as a DCS, where the information stored in the storage includes the ECD for its associated C&I system, according to an example embodiment.

A process unit block 109 includes processing equipment 108a, 108b, 108c and 108d (boilers, compressors, and pumps) configured for implementing an industrial process, a plurality of field devices (actuators and sensors, such as for sensing temperature and pressure) shown as 107a, 107b, 107c and 107d coupled to the processing equipment and to a C&I system 105a, 105b, 105c and 105d. As noted above, the C&I system devices include I/O modules that generally receive physical parametric (e.g., pressure, temperature) representations from sensors, and other C&I devices use these representations for regulating, safety, data acquisition and comparator systems for control, safety and instrumentation purposes. Each of the C&I systems 105a-d includes a storage device 160a (see FIG. 1B). FIG. 1B only shows storage device 160a for storing ECD data for first DCS 105a. Storage device 160a includes a data repository/database 162a (e.g., in the memory of a server) that stores ECD 166a. Each of the C&I systems 105a, 105b, 105c and 105d can also store their respective ECD in a respective data repository (e.g., in the memory of a server).

ECD collection system 100 includes a data agents block 110 shown including data agents associated with each C&I system including data agent 1 110a, data agent 2 110b, data agent 3 110c and data agent 4 110d, shown receiving ECD from the first DCS 105a, legacy DCS 105b, safety system 105c, and PLC or other controller 105d, respectively. The respective data agents (110a, 110b, 110c and 110d) each have the knowledge of the data format used in respective C&I system that they are associated with from which the network configuration (or topology) that needs to be collected including the network type used (e.g., Ethernet, fault tolerant Ethernet (FTE), a Local Control Network (LCN) or a wireless network) and the communication method used by the C&I system. As noted above, this information can be gathered from highly skilled individuals that perform detailed analysis of the respective C&I system during development of each parser.

As noted above, the data parsers have the data format and syntax information used in their respective C&I system built or coded therein. Each of the data agents can have custom information regarding the C&I system they are associated with. The network type and communication method used by each C&I system 105a-105d including their and C&I system are generally stored by each C&I system differently, such as in one or more engineering repositories such as data repository/database 162a shown in FIG. 1B. The data agents also have information regarding the location of the ECD stored in each C&I system.

As noted above, each of the C&I 105a-d includes a storage device 160a (FIG. 1B). FIG. 1B only shows storage device 160a for first DCS 105a. Storage device 160a includes a data repository/database 162a that stores ECD 166a, displays, connections, network and communication information 164a. Disclosed data agents 110a-d extract this information from their respective C&I system along with the references.

ECD collection system 100 has some collection information 126b (typically stored in memory 126 as shown in FIG. 1A provided during initial setup by end users (called "data collection setting") that includes collection information including a location (e.g. the node) that stores the ECD for the C&I system and the file format used in the C&I system including connectivity details such as the machine name and IP address where the ECD and associated data is stored and generally also credentials to connect to the system to their respective data agents (110a, 110b, 110c and 110d).

Using this collection information 126b provided from the data collection setting, ECD 100 will initiate a collecting data process. In the case of an EXPERION controller the communication method is star-based Fault Tolerant Ethernet (FTE), in the case of TPS/Protocol Conversion Application (PCA) controller it is a physical bus/logical ring token pass-based communication. The data agents 110a-d in the data agents block 110 are responsible for discovering the respective nodes in the network and the interconnection of the nodes in the C&I system that they are associated with. The data agents block 110 is designed for each C&I system and contains code that has knowledge of how the system works and how it stores the ECD.

Each C&I system (DCS 105a, legacy DCS 105b, safety system 105c, and PLC or other controller 105d) may employ one or more network types which can be standard networks such as Ethernet or a propriety communications network. The data agents 110a-d have knowledge of the file format from the C&I system whose ECD are being collected for system documentation (e.g., obtained from one or more data repositories 162a-d from which connections and references needs to be collected). In this case, disclosed data agents 110a-d may use different discovery methods for different C&I systems (e.g., one method for the DCS 105b and another method for PLC 105d) and for different communications network types.

Data agents block 110 is remotely executed, such as executing from a control room or in satellite rack room (SRR) in the IF 105. The data agents block 110 can be developed in a technology that is compatible with the technology platform (e.g., some DCS systems might be running on a different operating system (OS) such as LINUX, UNIX, etc.), so that the respective data agents 110a-d are each compatible with the operating system of the particular C&I system they are associated with. New data agents for the data agents block 110 can be developed and deployed to support the release of a new C&I system (e.g., a new DCS version).

Data collection block 120 includes ECD collection system 100. ECD collection system 100 provides data collection service functionality within data collection block 120. The data collection block 120 is responsible for starting and tracking the actual ECD collection service activity of the C&I system provided by the data agents block 110. The ECD collection system 100 includes a data agent list 120a that stores a list of all data agents 110a-d which are registered with ECD collection system 100, and which of the data agents is applicable for which C&I system along with the version of the C&I system. The ECD collection system 100 includes data collection (DC) configuration block 120b which stores a list of the C&I systems from which ECD needs to be collected, connectivity information to be used to connect to the C&I systems, and credentials (needed to access the C&I system, for security) to be used by the data agents in data agents block 110 to obtain access to the ECD. The data collection block 120 also includes data parsers 121a-121d stored in memory 126 that operate after the data agents 110a-d have collected ECD from their respective C&I system.

For each C&I system (105a-105d) the data collection block 120 starts the respective data agent 110a, 110b, 110c, 110d in the data agents block 110. Data collection block 120 starts a data parser (121a, 121b, 121c, 121d) after the respective data agents 110a, 110b, 110c, 110d have collected ECD from their associated C&I system. The data parsers 121a-d have knowledge of the format and syntax of data used in the C&I system. The data parsers are responsible for parsing and converting connections and references in a C&I system format into a common generic format which is stored in the information system which is represented as one or both of memory 130a and storage 130b of the data server 130 in FIG. 1A. In one embodiment, storage 130b can be a hard drive device that can contain multiple databases. As noted above, the ECD information stored generally includes a timestamp.

During execution, the data agents 110a-d transmit ECD 166a-d to data collection block 120 and also send a status message asynchronously to indicate the current status and progress of data collection. The data parsers 121a-d convert or translate the collected ECD data 166a-d from each of the C&I systems 105a-d into a common generic format (translated ECD) and stores the translated ECD 134 to memory 130a and/or storage 130b. The translated ECD in the common generic format is stored in data server 130. Data server 130 includes a processor 131.

Data parsers 121a-d can access information regarding the connections used in their associated C&S including physical and logical connections, where network connections are type of physical connection, generally stored in a database in the memory 130a of the data server 130. For each connection, information about the two ends of the connection are also stored. This information about the two ends of the connection helps in locating and resolving the tag.

The communication mechanism between the data collection block 120 and data agents 110a-d is generally not fixed. The data collection block 120 thus may use different communication mechanism to invoke and control different data agents 110a-d. The communication mechanism generally depends on the platform of the target system and technology in which data agent 110a-d is developed.

The data collection block 120 and data agents block 110 are both generally implemented by a processor 125 having associated memory 126 that stores a disclosed data collection algorithm 126a run by the processor 125. The processor 125 can comprise a microprocessor, digital signal processor (DSP), or microcontroller unit (MCU). Processor 125 can run or execute data collection algorithm 126a in order to collect engineering configuration data (ECD 166a-d) in a variety of data formats and translate the engineering configuration data into one common generic data format (translated ECD 134).

An application server 140 is connected to data server 130. Application server 140 includes a processor 141. The application server 130 provides the interface between the user interface layer and the ECD collection system 100. Upon receiving the request for initiation of ECD collection by a user, application server 140 prepares a list of systems from which data needs to be collected and passes the request to the ECD collection system 100. The application server 130 also sends the connectivity details that need to be used for data collection.

A user 145 is shown using user interface (UI) application 142 (such as in a control room) which upon an input by the user initiates an engineering configuration data collection request to the data collection block 120. In one embodiment, a DC configuration file is generated that is passed to ECD collection system 100 where it is stored as DC configuration file 120b. DC configuration file 120b stores the list of C&I systems from which data needs to be collected. It stores connectivity information that needs to be used to connect to the C&I system. It also stores credentials that will be used by data agents to get access to the C&I system's ECD.

The common generic format has representations for objects, connections and associations found in IFs. Objects have attributes that identify and describe them. Objects can be physical entities including Controllers, PLCs, Chassis, Racks, I/Os, Servers, Workstations or switches. Another set of objects is logical entity including installed application, control logic, batch control, ladder logic, safety logic, history references or human machine interface (HMI) references. The objects can be connected to exchange data and control, these are represented by connections. The connections represent a physical connection or a logical connection between two objects. Network connection between a controller and a server is an example of physical connection. Connection between two control logic to exchange data represents logical connection. The common generic format to store ECD enables a single information source being used to store ECD collected from different C&I systems. Additionally, a common format can be applied across the various C&I systems leads to uniform engineering and maintenance practices.

Data server 130 represents the information system that includes a memory 130a that stores the translated ECD 134 that is collected from the various C&I systems. It guarantees the atomicity (i.e., where at any point if the collected ECD has any error(s) it is not stored by the information system), consistency, isolation and durability of collected snapshot ECD. The data server 130 provides the necessary interfaces that can be used by an application server 140 to access the system configuration data stored as ECD 134.

The data collection algorithm 126a executing on processor 125 parses the received ECD 166a-d via data parsers 121a-d. The data collection block 120 sends a message to start the parsing after the collection of ECD is completed by the data agents. Data parsers 121a-d translate the collected ECD 166a-d having different formats into a single common generic format (translated ECD 134).

Figure 2:
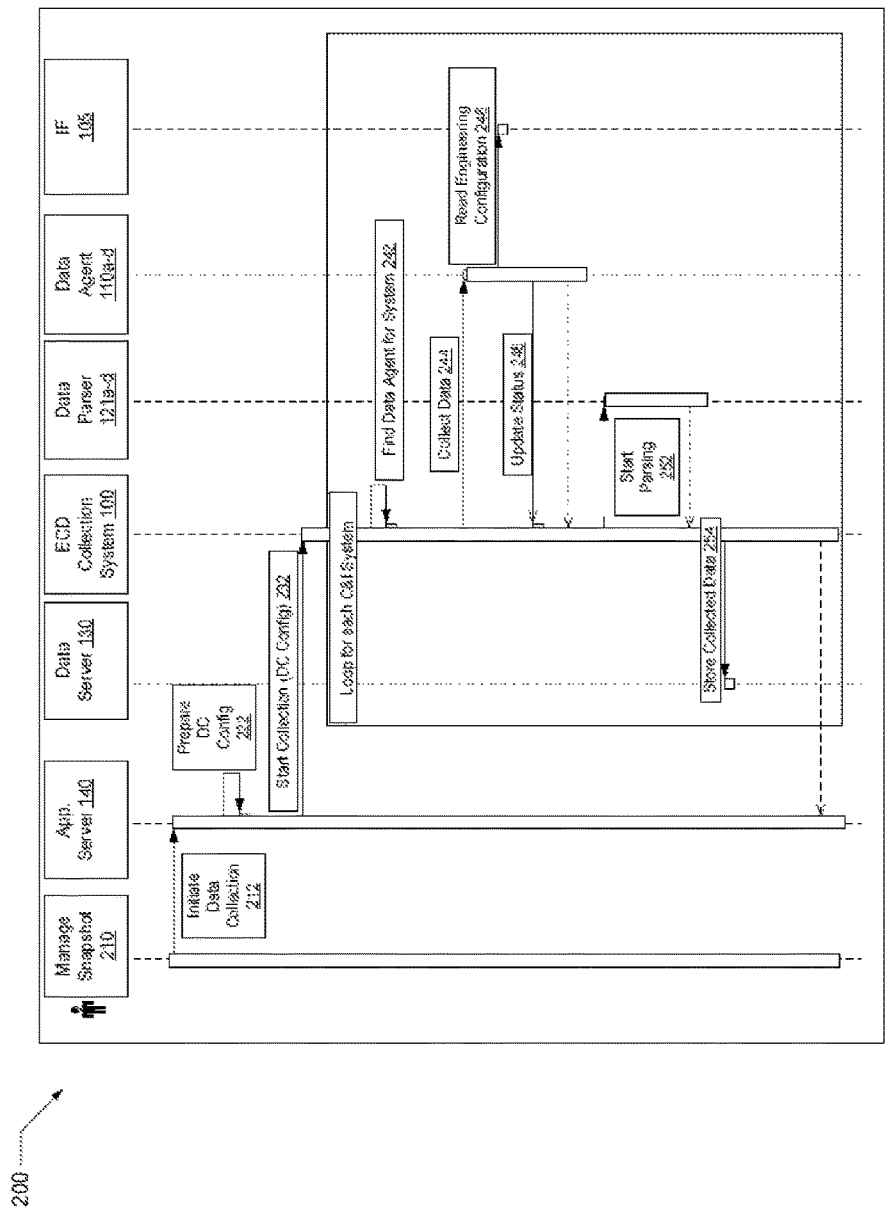
FIG. 2 illustrates a sequence of calls or requests exchanged between the components of the framework of FIG. 1A when data collection is initiated.

FIG. 2 illustrates a sequence of calls or requests 200 exchanged between the components of the data collection framework of FIG. 1A when data collection is initiated. The calls or requests are arranged along the time-line from top to bottom and also numbered in the temporal order they occur.

Data collection is initiated when a user places a request using the manage snapshot 210 user interface. Call or messages that are generated upon this request are described as follows. At initiate data collection 212, manage snapshot 212, via UI 142, sends a message to application server 140 to start the data collection activity. At prepare DC configuration 222, the ECD collection system 100 prepares the DC configuration file 120b that will be used as input. The DC configuration file 120b will have a list of industrial control and instrumentation systems from which ECD 166a-d needs to be collected. It will also have the connectivity details.

At start collection 232, the ECD collection system 100 starts to collect ECD with the DC configuration file 120b as an input. Steps 242 to 254 are repeated for each C&I system 105a-d whose ECD is to be collected. At find data agent for system 242, the ECD collection system 100 looks into the list of registered data agents 120a to find the one that is applicable for the current respective C&I system. At collect data 244, ECD collection system 100 sends a message to a respective one of data agents 110a-d along with the connectivity details.

At read ECD 246, the data agent starts reading the ECD from the respective C&I systems within IF 105. At update status 248, the data agent sends a status update message back to ECD collection system 100 asynchronously to indicate the current status and progress of data collection. At start parsing 252, the ECD collection system 100 sends a message to one of the respective data parsers 121a-d after data collection activity has been completed by the data agent. The data parser translates the collected ECD into a common generic format of translated ECD 134. At store collected data 254, the ECD collection system 100 sends a message to store the translated ECD 134 at the data server 130 after the data parser has completed the translation. The translated ECD 134 in the common generic format is finally stored in memory 130a or storage 130b of data server 130. Steps 242 to 254 are repeated for each C&I system 105a-d whose ECD is to be collected. The overall data collection for all of the C&I systems 105a-d is completed after ECD is collected from all the C&I systems 105a-d.

Figure 3:
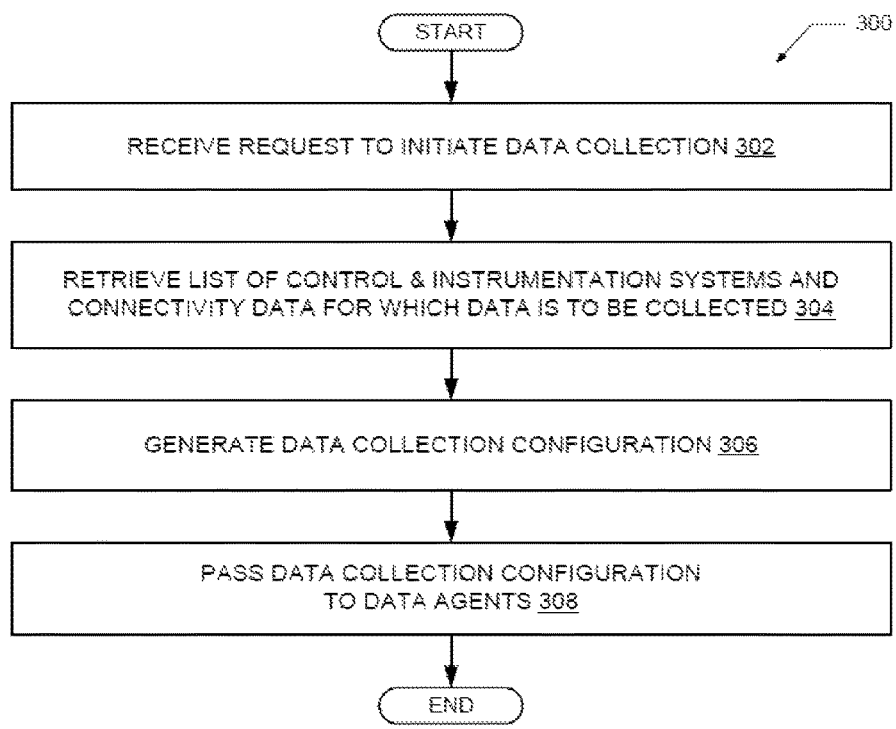
FIG. 3 is a flow chart that shows steps in an example method of generating a data collection configuration, according to an example embodiment.

FIG. 3 is a flow chart that shows steps in an example method 300 of generating DC configuration 120b. With reference to FIGS. 1A-3, method 300 can be implemented via the execution of data collection algorithm 126a by processor 125 and specifically by ECD collection system 100.

Method 300 begins at the start block and proceeds to block 302. At block 302, processor 125 receives a request to initiate the collection of ECD from C&I systems 105a-d. The request can be received from a user via UI 142. Processor 125 retrieves a list of C&I systems from which ECD is to be collected and connectivity data for the C&I systems 105a-d (block 304). Processor 125 generates the DC configuration file 120b that contains the C&I systems from which the ECD is to be collected and connectivity data for the C&I systems (block 306). Processor 125 passes the DC configuration file 120b to the data agents 110a-d (block 308). The DC configuration information is used by the data agents to connect to the Method 300 then ends.

Figure 4A:
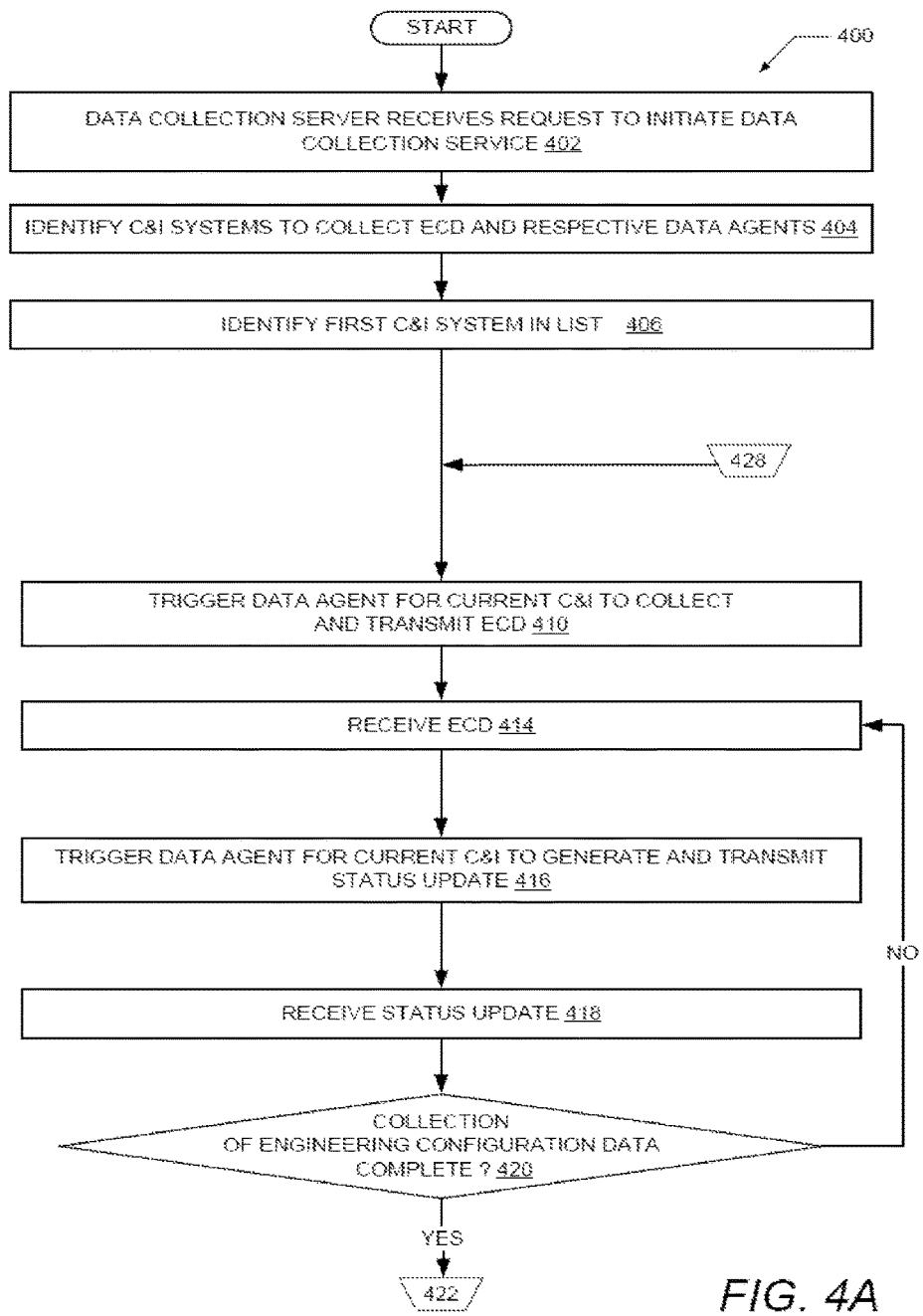
FIGS. 4A and 4B are a flow chart that shows steps in an example method of collecting ECD for an IF, according to an example embodiment.
Figure 4B:
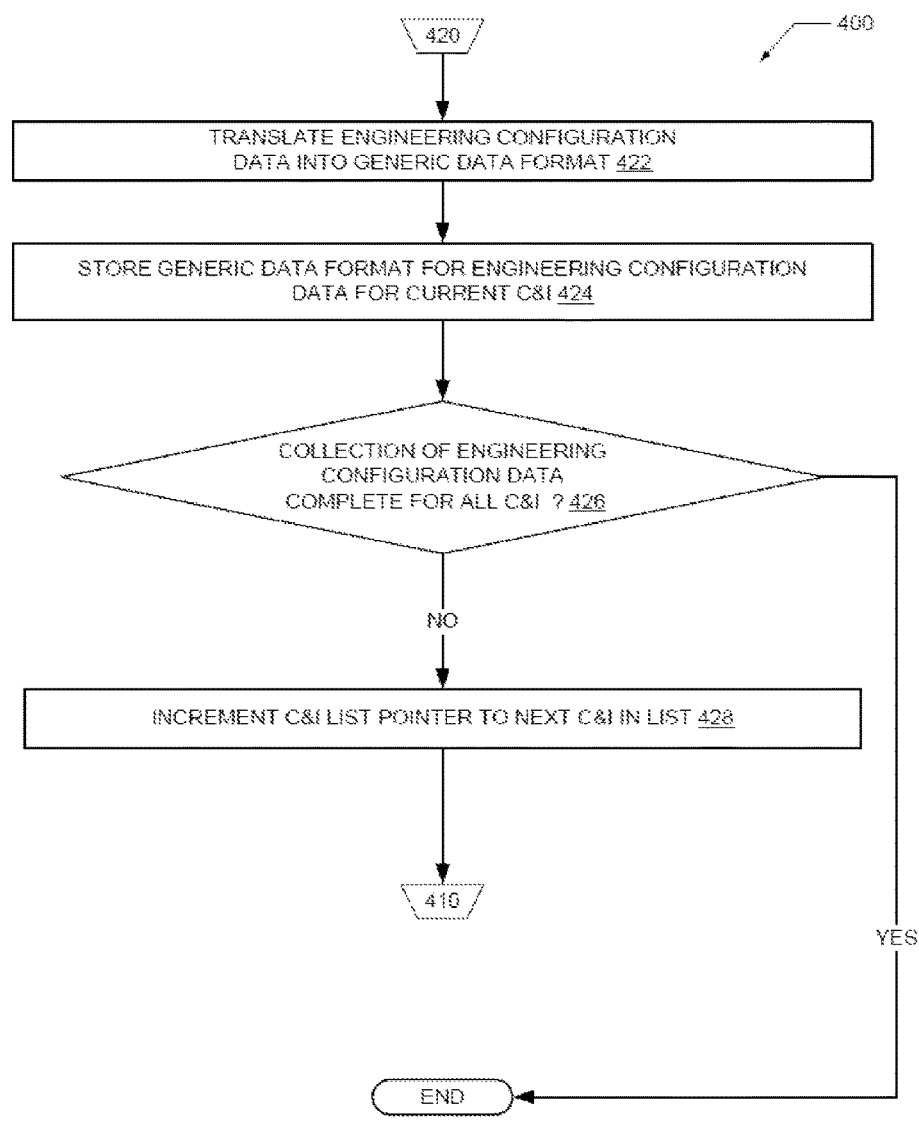

FIGS. 4A and 4B are a flow chart showing steps in an example method 400 of collecting ECD from C&I systems 105a-d. With reference to FIGS. 1A-4B, method 400 can be implemented via the execution of ECD collection algorithm 126a by processor 125. Method 400 begins at the start block and proceeds to block 402. At block 402, processor 125 receives a request to collect ECD from C&I systems 105a-d.

Processor 125 identifies the C&I systems 105a-d from which ECD is to be collected from the DC configuration file 120b and identifies their respective data agents 110a-d (block 404). Processor 125 identifies the first C&I system in the list (block 406). Processor 125 triggers the first data agent (i.e., data agent 110a) to collect ECD (i.e. ECD 166a) from the first respective C&I system 105a-d (i.e. C&I 105a) and to transmit the collected ECD to data collection system 100 (block 410). During the ECD collection process, the data agent at least partially uses some of the collection information 126b. The collection information 126b contains data regarding the C&S system including a location the ECD is stored and a file format used.

Processor 125 receives the collected ECD data (block 414). Processor 125 triggers the data agent to generate and transmit a status update of the status of the collection of ECD (block 416). Processor 125 receives the status update (block 418).

At decision block 420, processor 125 determines if the status update indicates that all of the ECD for the respective C&I system has been collected. In response to the status update indicating that all of the ECD for the respective C&I system has not been collected; processor 125 continues to receive ECD at block 314 and to trigger (block 416) and receive (block 418) the status update of collection of ECD. In response to the status update indicating that all of the ECD for the respective C&I system has been collected; processor 125 converts or translates the collected ECD into one common generic data format as translated ECD 134 (block 422). Processor 125 translates the collected ECD using a corresponding one of data parsers 121a-d (i.e. data parser 121a). The translated ECD 134 is stored to memory 130a (block 424).

At decision block 426, processor 125 determines if ECD for all of the C&I systems 105a-d have been collected. In response to ECD for all of the C&I systems 105a-d having been collected, method 400 ends. In response to ECD for all of the C&I systems 105a-d not having been collected, processor 125 increments a pointer to the next C&I system in the list (i.e. C&I 105b) (block 428) and returns to block 410 where processor 125 triggers the next data agent (i.e. data agent 110b) to collect and transmit ECD for the next C&I system (i.e., 105b). Method 400 continues until the ECD has been collected for all of the C&I 105a-d.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer-readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of engineering configuration data (ECD) collection for an industrial facility (IF), comprising:
said IF including a plurality of control and instrumentation (C&I) systems including a first C&I system having first ECD using a first file format and a second C&I system having second ECD using a second file format, wherein said first and said second ECD include information about connections of elements including physical entities and logical entities of said C&I systems reflected in a network topology, and data flow between said C&I systems, and a data collection server including a memory;
providing a first data agent having collection information regarding said first C&I system including a location of said first ECD and said first file format, and a second data agent having collection information regarding said second C&I system including a location of said second ECD and said second file format;
triggering the first data agent and the second data agent to collect ECD from the first C&I system and the second C&I system respectively;
triggering the first data agent and second data agent to generate and transmit a status update of the status of the collection of ECD;
determining the status update that all of the ECD for the respective C&I system have been collected;
translating said first ECD and said second ECD both into one common generic data format using a corresponding data parser, wherein the common generic data format includes representations for objects and the connections in the IF, wherein the objects have attributes that identify and describe them including for the physical entities including controllers, chassis, racks, input/outputs (I/Os), servers, workstations and switches, with another set of the objects for the logical entities including an installed application, control logic, batch control, ladder logic, and safety logic, and wherein the objects can be connected to exchange data and control during operation of a process run by the IF represented by the connections which represent a physical connection between the physical entities and a logical connection between the logical entities, and
storing said first ECD and said second ECD after said translating in said memory.

2. The method of claim 1, wherein said first ECD and said second ECD is stored in said storing along with a timestamp.

3. The method of claim 1, wherein said first C&I system and said second C&I system utilize different communication protocols, further comprising:
    a first data parser receiving said first ECD and translating said first ECD into said common generic data format; and
    a second data parser receiving said second ECD and translating said second ECD into said common generic data format.

4. The method of claim 3, wherein said first data parser utilizes stored ones of the physical connections and ones of the logical connections used in said first ECD and said second data parser utilizes stored ones of the physical connections and ones of logical connections used in said second ECD.

5. The method of claim 1, wherein said collection information includes credentials for security needed to access said first C&I system and to access said second C&I system.

6. A system for collecting engineering configuration data (ECD) for an industrial facility (IF), the system comprising:
    a data collection server communicatively coupled by a communication device to a plurality of control and instrumentation (C&I) systems including a first C&I system having first ECD using a first file format and a second C&I system having second ECD using a second file format, wherein said first and said second ECD include information about connections of elements including physical entities and logical entities of said C&I systems reflected in a network topology, and data flow between said C&I systems, said data collection server including a processor connected to a memory storing a data collection and translation module, wherein said data collection server is programmed to implement said data collection and translation module causing said data collection server to:
    provide a first data agent having collection information regarding said first C&I system including a location of said first ECD and said first file format, and a second data agent having collection information regarding said second C&I system including a location of said second ECD and said second file format;
    collect, via said first data agent, said first ECD and collect, via said second data agent, said second ECD;
    trigger the first data agent and the second data agent to collect ECD from the first C&I system and the second C&I system respectively;
    trigger the first data agent and second data agent to generate and transmit a status update of a status of the collection of said ECD;
    determine the status update that all of the ECD for the respective C&I system have been collected;
    translate said first ECD and said second ECD both into one common generic data format using a corresponding data parser, wherein the common generic data format includes representations for objects and the connections in the IF, wherein the objects have attributes that identify and describe them including the physical entities including controllers, chassis, racks, input/outputs (I/Os), servers, workstations and switches, with another set of the objects for the logical entities including an installed application, control logic, batch control, ladder logic, and safety logic, and wherein the objects can be connected to exchange data and control during operation of a process run by the IF represented by the connections which represent a physical connection between the physical entities and a logical connection between the logical entities, and
    store said first ECD and said second ECD after said translating at said memory.

7. The system of claim 6, wherein said first ECD and said second ECD is stored with a timestamp.

8. The system of claim 6, wherein said first C&I system and said second C&I system utilize different communication protocols and wherein said data collection and translation module further comprises:
    a first data parser receiving said first ECD and translating said first ECD into said common generic data format; and
    a second data parser receiving said second ECD and translating said second ECD into said common generic data format.

9. The system of claim 8, further comprising a data collection (DC) configuration block which stores a list of C&I systems including said first C&I system and said second C&I system and stores said collection information, said collection information further including credentials for security needed to access said first C&I system and said second C&I system.

10. A computer program product, comprising:
    a memory that includes program instructions executable by a processor of a data collection server to enable said processor to execute a method of engineering configuration data (ECD) collection for an industrial facility (IF), said IF including a plurality of control and instrumentation (C&I) systems including a first C&I system having first ECD using a first file format and a second C&I system having second ECD using a second file format, wherein said first and said second ECD include information about connections of elements including physical entities and logical entities of said C&I systems reflected in a network topology, and data flow between said C&I systems, and wherein said data collection server is communicatively coupled by a communication device to said C&I systems, said computer program product comprising:
    code for providing a first data agent having collection information regarding said first C&I system including a location of said first ECD and said first file format, and a second data agent having collection information regarding said second C&I system including a location of said second ECD and said second file format;
    code for trigger the first data agent and the second data agent to collect said ECD from the first C&I system and the second C&I system respectively;
    code for trigger the first data agent and second data agent to generate and transmit a status update of a status of the collection of ECD;
    code for determine the status update that all of the ECD for the respective C&I system have been collected;
    code for translating said first ECD and said second ECD both into one common generic data format, wherein the common generic data format includes representations for objects and the connections in the IF, wherein the objects have attributes that identify and describe them including the physical entities including controllers, chassis, racks, input/outputs (I/Os), servers, workstations and switches, with another set of the objects for logical entities including an installed application, control logic, batch control, ladder logic, and safety logic, and wherein the objects can be connected to exchange data and control during operation of a process run by the IF represented by the connections which represent a physical connection between the physical entities 49-F and a logical connection between the logical entities, and code for storing said first ECD and said second ECD after said translating at said data collection server.

11. The computer program product of claim 10, wherein said first ECD and said second ECD is stored with a timestamp.

12. The computer program product of claim 10, wherein said first C&I system and said second C&I system utilize different communication protocols and wherein said computer program product further comprises:

code for a first data parser receiving said first ECD and translating said first ECD into said common generic data format; and code for a second data parser receiving said second ECD and translating said second ECD into said common generic data format.

13. The computer program product of claim 12, wherein said collection information includes credentials for security needed to access said first C&I system and said second C&I system.

\* \* \* \* \*